United States Patent
Hansson et al.

(10) Patent No.: US 10,677,320 B2
(45) Date of Patent: Jun. 9, 2020

(54) EPICYCLIC GEAR TRAIN

(71) Applicant: Swepart Transmission AB, Liatorp (SE)

(72) Inventors: Hans Hansson, Agunnaryd (SE); Marcus Månsson, Älmhult (SE)

(73) Assignee: SWEPART TRANSMISSION AB (SE)

(*) Notice: Subject to any disclaimer, the term of this patent is extended or adjusted under 35 U.S.C. 154(b) by 184 days.

(21) Appl. No.: 15/575,817

(22) PCT Filed: Jun. 1, 2016

(86) PCT No.: PCT/EP2016/062343
§ 371 (c)(1),
(2) Date: Nov. 21, 2017

(87) PCT Pub. No.: WO2016/193286
PCT Pub. Date: Dec. 8, 2016

(65) Prior Publication Data
US 2018/0172112 A1    Jun. 21, 2018

(30) Foreign Application Priority Data
Jun. 4, 2015 (EP) .................................. 15170665

(51) Int. Cl.
*F16H 1/28* (2006.01)
*F16H 57/08* (2006.01)

(52) U.S. Cl.
CPC ......... *F16H 1/2836* (2013.01); *F16H 1/2809* (2013.01); *F16H 57/08* (2013.01); *F16H 2057/085* (2013.01)

(58) Field of Classification Search
CPC ...... F16H 1/2836; F16H 57/08; F16H 1/2809; F16H 2057/085
See application file for complete search history.

(56) References Cited

U.S. PATENT DOCUMENTS

2010/0197444 A1* 8/2010 Montestruc ........... F16H 1/2836
475/331
2010/0197445 A1* 8/2010 Montestruc ........... F16H 1/2836
475/346

(Continued)

FOREIGN PATENT DOCUMENTS

DE    195 25 831 A1    1/1997
DE    197 56 967 A1    6/1999

(Continued)

OTHER PUBLICATIONS

DE 197 56 967 A1, cited in ISR dated Jul. 27, 2016, issued in related International Application No. PCT/EP2016/062343

(Continued)

*Primary Examiner* — David J Hlavka
(74) *Attorney, Agent, or Firm* — Condo Roccia Koptiw LLP (57) ABSTRACT

The present disclosure relates to an epicyclic gear train comprising a driving member (3), driving a plurality of planetary gears (7). Each planetary gear is attached to a planetary holder and meshes with at least one ring gear. Thereby the ring gear or the planetary holder is made to rotate about a central axis (21) of the epicyclic gear train. The other one of the ring gear and the planetary holder is fixed to a stationary part (5) of the gear train. The planetary gears (7) are attached to the planetary holder, each via at least one planetary connector (17) which is rotatable around an axis (24) offset from and parallel to the planetary axis (23), such that turning said at least one planetary connector alters the distance between the central axis (21) and the planetary axis (23) by means of an eccentric connection. The planetary connectors are rotatingly pre-tensioned to apply a pressure on the planetary axis (23) away from the central (Continued)

axis (21), and said at least one planetary connector is attached to the planetary holder by a bearing (27).

13 Claims, 5 Drawing Sheets (56) References Cited

U.S. PATENT DOCUMENTS

| | | | | |
|---|---|---|---|---|
| 2015/0345591 | A1* | 12/2015 | Altamura | F16H 57/0479 |
| | | | | 475/159 |
| 2016/0348759 | A1* | 12/2016 | McCloy | F16H 1/2863 |
| 2018/0266518 | A1* | 9/2018 | Oe | F01L 1/352 |

FOREIGN PATENT DOCUMENTS

| | | |
|---|---|---|
| DE | 10-2012-207250 A1 | 11/2013 |
| WO | WO 2014/173701 A1 | 10/2014 |

OTHER PUBLICATIONS

DE 195 25 831 A1, Cited in the ISR dated Jul. 27, 2016, issued in related International Application No. PCT/EP2016/062343.
DE 102012207250 A, Cited in Official Action dated Jun. 27, 2019 in related Chinese Application No. 201680025546. Machine translation attached.

* cited by examiner

EPICYCLIC GEAR TRAIN

CROSS REFERENCE TO RELATED APPLICATIONS

This application is the National Stage Entry under 35 U.S.C. § 371 of Patent Cooperation Treaty Application No. PCT/EP2016/062343, filed 1 Jun. 2016, which claims the benefit of European Application No. 15170665.2, filed 4 Jun. 2015, the contents of which are hereby incorporated by reference herein.

TECHNICAL FIELD

The present disclosure relates to an epicyclic gear train comprising a driving member, driving a plurality of planetary gears, each planetary gear being attached to a planetary holder and rotating around a planetary axis, and having at least one gear portion, meshing with at least one ring gear. The ring gear or the planetary holder is thereby made to rotate about a central axis of the epicyclic gear train. Each planetary gear is attached to the planetary holder via at least one planetary connector which is rotatable around an axis which is offset from the planetary axis, such that turning said at least one planetary connector alters the distance between a central axis of the gear train and the planetary axis by means of an eccentric connection.

BACKGROUND

Such a gear train is known from WO-2014/173701-A1. Thanks to the adjusting arrangement, the planetary axes can be moved outwards, from the central axis, until meshing closely with the ring gears, thereby reducing backlash which can be useful for instance when the gear train is used for positioning purposes.

One problem associated with such a gear train is how to further reduce backlash.

SUMMARY

One object of the present disclosure is therefore how to provide a gear train with even further reduced backlash. This object is achieved by means of a gear train as defined in claim 1. More specifically, in a gear train of the initially mentioned kind, at least one planetary connector is rotatingly pre-tensioned to apply a pressure on the planetary axis away from the central axis, and the planetary connector is attached to the planetary holder by a bearing. With such an arrangement, the gear train becomes capable to eliminate backlash that arises e.g. after long use due to wear. Also, thanks to the rotating force provided to each planetary connector, any variations along the periphery of the ring gear or ring gears may be compensated for, as the planetary axis may be radially moved even during an individual turn around the central axis of the gear train.

It is possible to allow the planetary connector of each planetary gear to be pre-tensioned, and this may be achieved by means of a central gear, which is co-axial with the central axis, being pre-tensioned by means of a spring. The central gear may mesh with planetary control gears connected to a planetary connector of each planetary gear.

Alternatively, the planetary connector of each planetary gear may comprise a spring, individually pre-tensioning the planetary connector.

The spring may be a helical torsion spring or alternatively e.g. a blade spring or a coil spring. Preferably, the spring is a compression spring.

Each planetary gear may have first and second interconnected gear portions, the first gear meshing with a first ring gear, which is stationary, and the second gear meshing with a second ring gear which is thereby made to rotate about a central axis of the epicyclic gear train. The ring gear then have different number of teeth. This may provide a gear train with very high gear ratio. At least one of the gear portions and the ring gear with which it meshes may be conical or bevelled.

The driving member may be located at the centre axis of the gear train and drive the planetary gears directly, or may alternatively be offset from the central axis and drive a gear of the planetary holder. The latter case allows the provisioning of a centre opening in the gear train, through which cables or the like may run.

The bearing used to connect the planet gear to the planet holder may be a ball or roller bearing, or alternatively a plain bearing.

The driving member may be a driving pinion.

Each planetary control gear may be connected to an end of a planetary shaft.

DETAILED DESCRIPTION

The present disclosure relates to an epicyclic gear train (also referred to as a planetary gear train) that often accomplishes a high overall gear ratio, e.g. higher than 50:1, often even up to 400:1, and with a compact structure.

Figure 1:
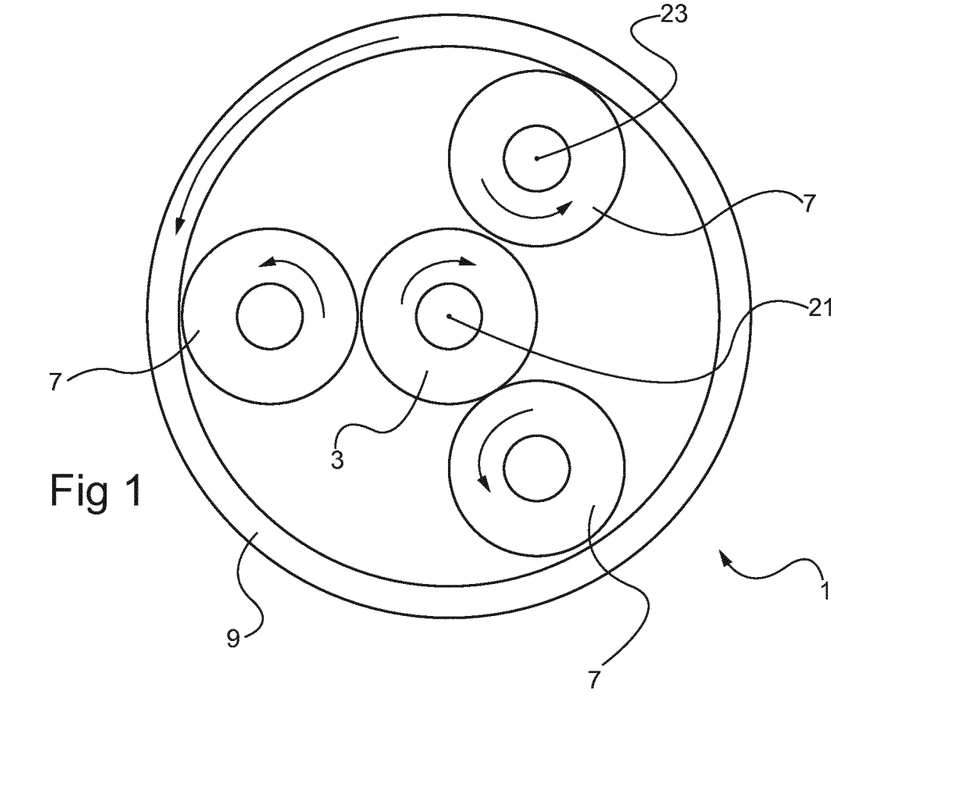
FIG. 1 illustrates schematically an axial front view of a epicyclic gear train with a central driving pinion.
Figure 2:
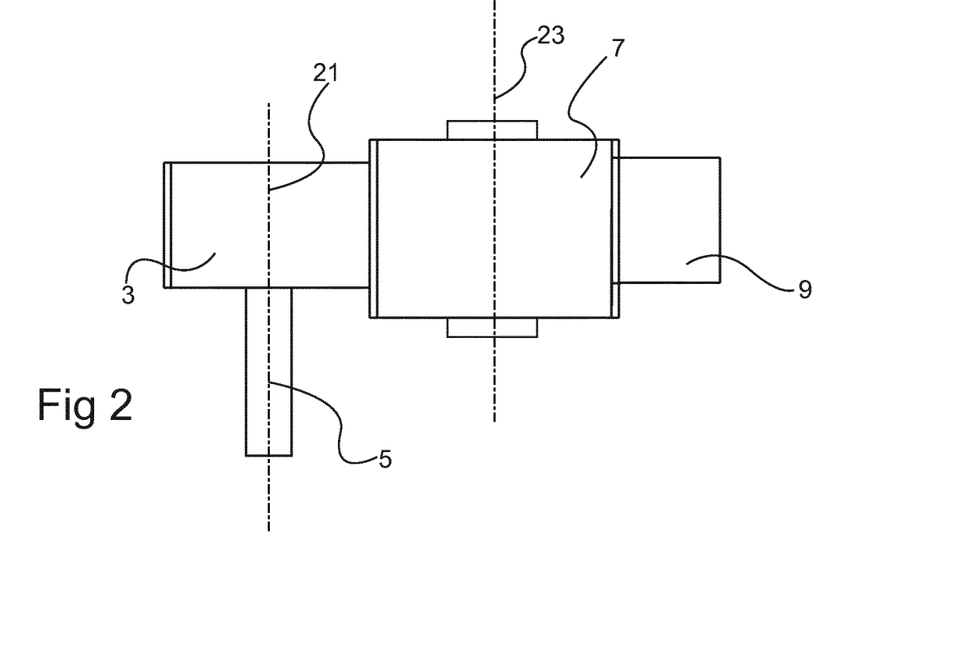
FIG. 2 shows a partial radial cross-section of the gear train in FIG. 1.

FIG. 1 illustrates, very schematically, an axial front view of a planetary gear train 1 with a central driving member in the form of a driving pinion 3. The gear train 1 may have an outer casing (not shown in FIG. 1) that may be attached to a structure to provide a stationary reference point with regard to the operation of the gear train. FIG. 2 shows a partial radial cross-section through the gear train in FIG. 1. The driving pinion 3, typically driven by an incoming shaft, turns around a central axis 21 of the gear train and meshes with planetary gears 7, which are attached to a planetary holder (not shown), and each turn around a planetary axis 23. In the illustrated case three planetary gears 7 are used, although the number of planetary gears may be different.

The planetary gears 7 in turn mesh with an outer ring gear 9. In the illustrated case, if the planetary holder is fixed, this makes the ring gear 9 turn around the central axis 21, and the ring gear may be connected to an outgoing shaft. The gear ratio depends in this case on the ratio between the driving pinion 3 and the ring gear 9. Alternatively, the ring gear 9 may be fixed, and the outgoing shaft may be connected to the planetary holder.

Figure 3:
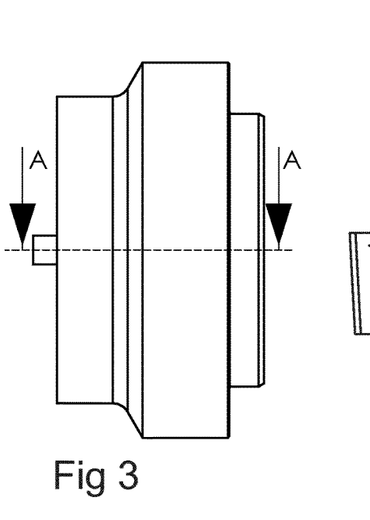
FIG. 3 shows a side view of a epicyclic gear train.
Figure 4A:
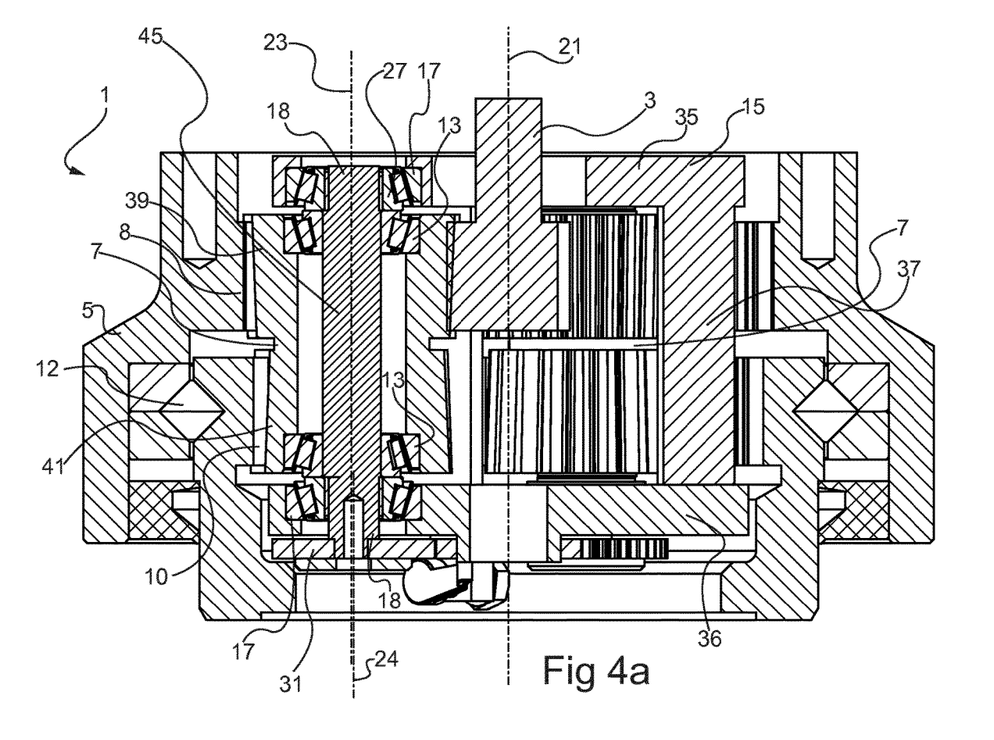
FIG. 4a shows a cross section along the line A-A in FIG. 3.

A much greater gear ratio may be obtained with the use of two ring gears and split planetary gears, as is shown in 3 and 4a.

FIG. 3 shows a planetary gear train and FIG. 4a shows a cross-section along the line A-A in FIG. 3. The gear train has three planetary gears 7. As mentioned, although three planetary gears will be considered preferred in most applications, a different number of planetary gears may be conceivable. Each planetary gear 7 comprises a first 39 and a second 41 gear portion which are arranged rotatably on a common axis by means of bearings 13, and are mutually connected such that they rotate with the same speed. The planetary gear is thus split. The first 39 and second 41 gear portion in each planetary gear 7 may even be devised in one single piece, but may also have different sizes in terms of number of teeth. In FIG. 4a, the planetary gear to the left is shown in cross section while a front view of another planetary gear, located behind the plane of the cross section, is given to the right.

The planetary gears 7 are arranged in a common planet holder 15, cf. FIG. 4a, which may be formed by two circular plates 35, 36. One 35 of the plates 35, 36 is provided with spacers 37 in order to provide a space between the plates 35, 36 that is sufficient to give room for the planetary gears 7 between the plates 35, 36. In the illustrated planet holder, three planetary gears are evenly provided at 120° spacing for the example with three planetary gears, although different angular spacings are in principle possible.

As can be seen e.g. in FIG. 4a, the centrally located driving pinion 3 meshes with the first gear portion 39 in each planetary gear 7. Each of the first gear portions 39 in the planetary gears 7 further meshes, at different locations, with a first outer ring gear 8, which is stationary by being attached to an outer casing 5. As a result, the rotation of the driving pinion 3, which in this example is aligned with a central axis 21 of the gear train, makes the axes 23 of the planetary gears 7 circulate around the central axis 21 while each of the planetary gears 7 turn around a respective planetary axis 23 and the central axis 21.

The second gear portion 41 of each planetary gear 7 meshes with a second outer ring gear 10, which is arranged to be turned around the central axis 21 by means of bearings 12. As the first 39 and second 41 gear portion of each planetary gear 7 may have mutually different number of teeth, although this is not necessary, and further the first 8 and second 10 ring gears have mutually different number of teeth, the movement of the planetary gears 7 make the second ring gear 10 move relative to the first ring gear 8 and thus turn around the central axis 21. The second ring gear 10 may be connected to an outgoing shaft (not shown). As compared to the angular speed of the driving pinion 3, the angular speed of the second ring gear 10 will be very low. The first and second ring gears are here numbered as they appear as seen from the driving pinion's side of the gear train. It is possible to have the lower ring gear 10 fixed and the upper ring gear 8 connected to a gear train output instead.

Table 1 below provides an example of an epicyclic gear train, applicable to FIG. 4a, and its corresponding gear ratio:

| Part | Number of teeth |
| --- | --- |
| Driving pinion (3), connected to input shaft | $Z_1 = 13$ |
| Planetary first gear portion (39) driven by pinion | $Z_2 = 26$ |
| First ring gear (8), fixed | $Z_3 = 65$ |

-continued

| Part | Number of teeth |
| --- | --- |
| Planetary second gear portion (41) | $Z_4 = 25$ |
| Second ring gear (10), connected to output shaft | $Z_5 = 64$ |

This example gives a gear ratio of U=256, as determined by the formula:

$$U = \frac{1 + \frac{Z_3}{Z_1}}{1 - \frac{Z_3 Z_4}{Z_2 Z_5}}$$

The present disclosure is related to reducing backlash in epicyclic gear trains. Backlash may be a significant problem, typically in applications where the gear is used to position a device accurately. Such applications include industrial robots and transducers of different kinds, and e.g. solar power systems where a gear can be used to align a solar panel with regard to an optimal normal axis. Other possible applications include for instance wind power systems, etc. The gear train disclosed herewith is primarily intended for industrial robot applications. Further, the present disclosure describes a planetary gear train that may provide an improved load distribution between the different planetary gears 7.

Figure 4B:
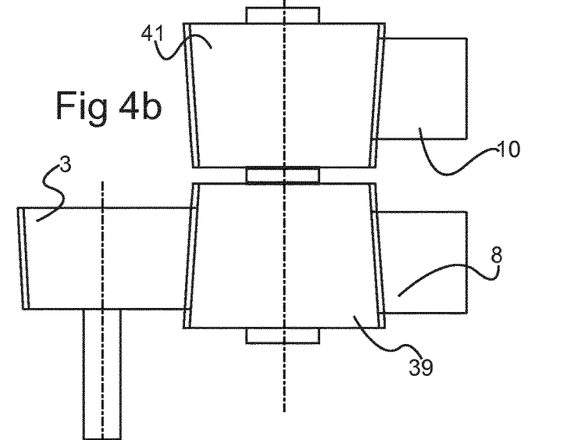
FIG. 4b illustrates schematically an arrangement with conical planet gear portions.

FIG. 4b illustrates schematically the backlash eliminating arrangement of the present disclosure, e.g. in FIG. 4a. Backlash is eliminated by letting the planet holder 15 float to some extent in the axial direction of the gear train as a whole, by using slightly bevelled or conical gears, and by adjusting the distance between the axes 23 of the planetary gears 7 and the central axis 21, i.e. the radial position between the gear centre and the planetary gears 7. For instance, in a case where there is a slight play between the second planetary gear portion 41 and the second ring gear 10, this play can be eliminated by moving the planetary gear axis 23 outwards, away from the central axis 21 of the gear as a whole. This also makes the planetary gear, in the floating planetary holder 15, move slightly downwards, along the planetary gear axis 23, such that the aforementioned movement to the left of the planet gear does not build excessive tension on the first ring gear 8 from the first planetary gear portion 39. At the same time the conical driving pinion 3 may be moved downwards as well. The torque applied by the driving pinion 3 is however relatively low and it is therefore possible also to adjust the driving pinion radially such that it drives e.g. only two out of three planetary gears.

The radial positions of the planetary gears 7 may be adjusted symmetrically, such that the planetary gear axes 23 all travel along a single cylinder which is coaxial with the central axis 21 of the gear train. Alternatively, the position of each planetary gear axis may in principle be adjusted individually. This can reduce backlash but could also imply an uneven load distribution among the planetary gears, although this can be allowed in some applications.

The first 39 and the second 41 gear portions in each planetary gear 7 may be conically inclined or bevelled as is indicated in FIG. 4b. The conical inclinations are much exaggerated in FIG. 4b to explain the concept more clearly. In a real gear train as shown in FIG. 4a, the gears may typically be inclined 0.5-4°.

Figure 4C:
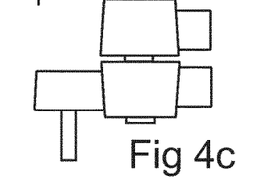
FIGS. 4c and 4d illustrate alternative embodiments.

The first and second gears in each planetary gear may have their narrower ends at their mutually closest points as shown in FIG. 4b. Each ring gear further have an inclination that corresponds to the gear in the planetary gear portion with which it meshes. This means that the planetary gears and the planet holder are trapped by the ring gears, and can be floating without being otherwise axially supported. The same effect could be achieved with conical gear portions that are interconnected at their wider ends as shown in FIG. 4c.

The driving pinion may be displaced to drive e.g. only two out of three planetary gears if the planetary gear axes are moved outwards in order to eliminate backlash in the gear train.

Figure 4D:
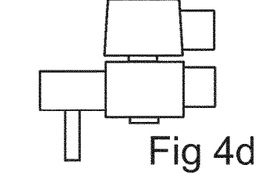

It may be sufficient that one planetary gear portion and ring wheel pair for each planetary gear is conical or bevelled. This conceivable configuration is schematically indicated in FIG. 4d, where the driving pinion and the planetary gear portion which it drives may thus be cylindrical and most likely less expensive. The driving pinion may then be displaced to drive e.g. only two out of three planetary gears if the planetary gear axes are moved outwards in order to eliminate backlash in the cylindrical section. As the planet holder is not floating in this configuration, an axial support (not shown) should be applied unless the planet holder can be kept in place by gravity.

The gear train 1, with reference to FIG. 4a, includes an adjusting arrangement which is arranged to change the distance between the central axis and each planetary axis.

Each planetary gear 7 is attached to the planetary holder 15 via planetary connectors, in the illustrated case including roller bearings 17, which are rotatable around an axis 24 which is slightly offset from the planetary axis 23. As illustrated, this may be obtained by providing a planetary shaft 45. The planetary gear 7, with first and second gear portions 39, 41 is hollow to accommodate the planetary shaft 45, and is capable of turning around the planetary shaft by means of a first set of bearings 13, placed at the upper and lower end of the planetary gear 7. Conical roller bearings, also referred to as taper roller bearings, may be preferred as they allow the setup to be pre-tensioned in order to fit the planetary gear 7 tightly to the planetary shaft 45.

The planetary shaft 45 in turn has a second set of bearings 17 which are located at the ends of the planetary shaft 45, and are slightly radially offset with regard to the first set of bearings 13. This may be achieved by providing a slightly eccentric portion of the planetary shaft at each end 18 thereof. The planetary connector in this case thus comprises each end 18 of the planetary shaft 45, and the second set of bearings 17. This means that turning a planetary connector, i.e. turning the planetary shaft 45 with respect to the planetary holder 15, alters the distance between the central axis 21 and the planetary axis 23 by means of this eccentric connection.

In addition to the eccentric adjustment of the planetary axis, the planetary connectors are rotatingly pre-tensioned in a direction that forces the planetary axis slightly outwards.

Figure 5:
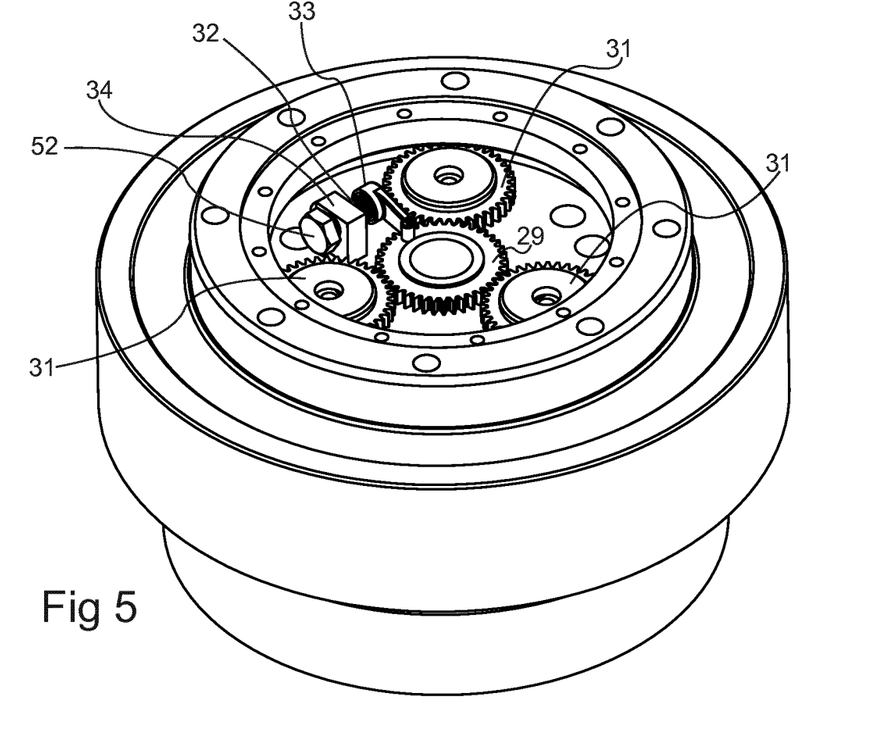
FIGS. 5 and 6 illustrate a first option for obtaining a pre-tensioning arrangement.
Figure 6:
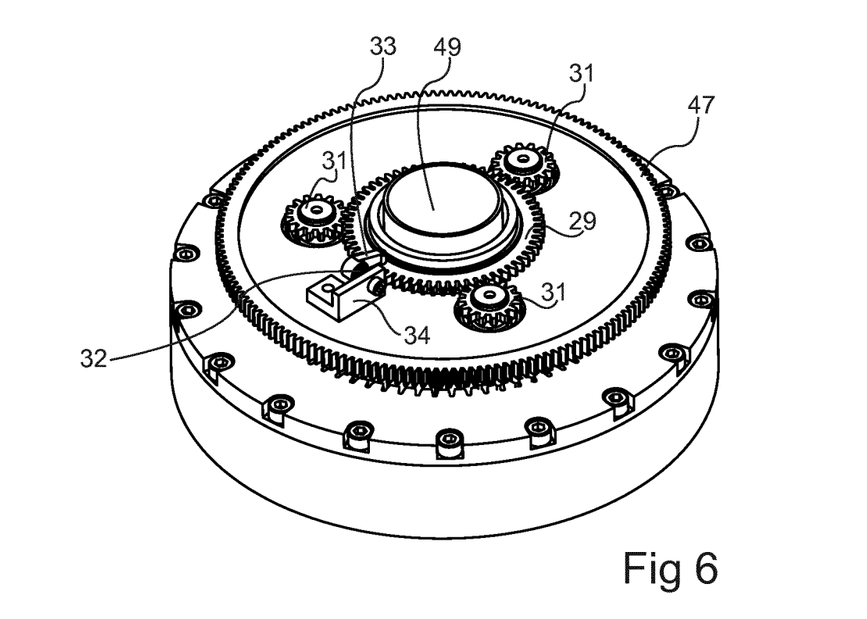

FIGS. 5 and 6 illustrate a first option for obtaining a pre-tensioning arrangement. In this case, a central gear 29 is used to apply equal rotational movement to all planetary connectors. The central gear 29 is pre-tensioned by means of a compression spring 32 attached to the planetary holder 15. The central gear 29 is pre-tensioned by the compression spring 32 via a lever arm 33. The compression spring 32 is attached to the planetary holder by means of a spring bracket 34. The pre-tensioning force can be adjusted by an adjustment screw 52. The central gear 29 meshes with one planetary control gear 31 per planetary connector. Each planetary control gear 31 is a gear secured to an end 18 of a respective planetary shaft 45, as illustrated in FIG. 4a. The force from the central gear 29 attempts to rotate all planetary shafts the same rotational distance and thus making each planetary shaft move outwards if possible, as previously described, until play/backlash is eliminated. If, for instance because of long use and wear, new play comes into existence, this is continuously eliminated by the spring's application of the force. The same applies if the gear train is deformed, e.g. by rising temperatures.

An equal load distribution will be obtained if three planet gears are used. As will be shown, other possibilities for obtaining the pre-tensioning exist.

The amount of pre-tensioning, which is determined by the spring force and the eccentric geometry, should be determined depending on the application. Typically, backlash should be eliminated up to a predetermined torque level, but not for torques exceeding that level, e.g. in emergency brake situations where backlash does not matter. A too powerful pre-tensioning of the planetary axes outwards will reduce efficiency and service life, and increase wear. The pre-tensioning can be set individually for each gear train to prevent backlash at normal operating conditions when backlash is negative for the performance but not apply extra loads for high torques when backlash can be accepted as for example at emergency stop.

Figure 9:
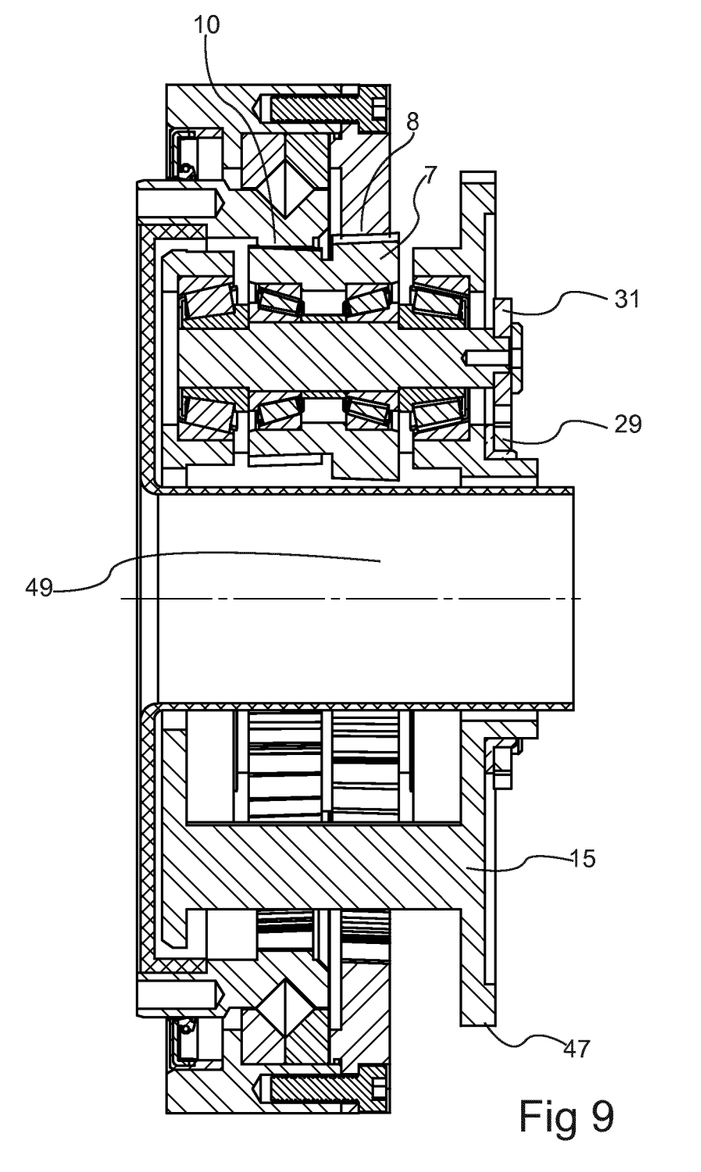
FIG. 9 shows a cross section through a gear train with a centre opening.

Briefly, with reference to FIG. 9, it is shown a gear train with a hollow centre, in cross section. This gear train has a different overall structure, although the backlash eliminating arrangement of the present disclosure can be very similar. The hollow centre 49 is obtained in order to be able e.g. to lead through cables or the like from one side of the gear train to the other, something that is very useful e.g. in industrial robotics applications. In this case therefore, the driving pinion does not mesh with the planetary gears directly, but with the planet holder 15. For this reason, a planet holder gear 47 is used, best shown in FIG. 6. The driving pinion thus drives the planet holder, which rotates and make the planetary gears mesh with the ring gears while they travel around the central axis of the gear train. The output motion is then provided by one of the ring gears. The ring gear not providing output motion is locked to a stationary part, such as the gear train casing, of the gear train. The pre-tensioning can be obtained in the same way as described hereinbefore with reference to FIG. 6, i.e. by having a compression spring, attached to the planet holder 15, that provides a turning force to a central gear 29, meshing with a control gear 31 of each of the planetary connectors, as previously mentioned.

Figure 7:
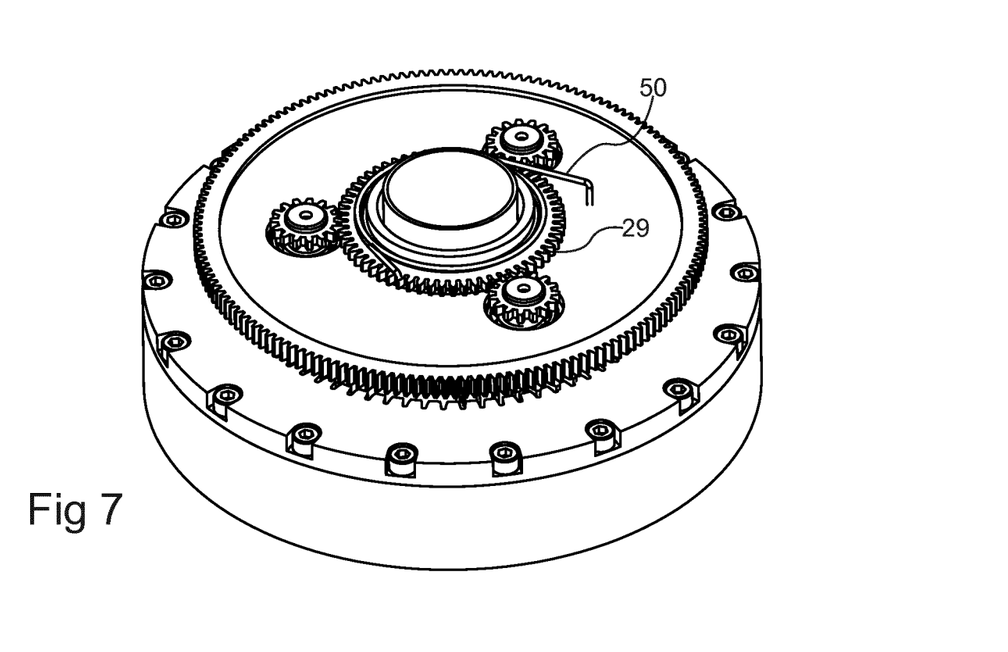
FIGS. 7 and 8 illustrate other options for obtaining a pre-tensioning arrangement.

FIG. 7 illustrates another option, where a helical torsion spring 50, attached to the central gear 29, is used instead of a compression spring. Alternatively, a tension spring or a blade spring may be used instead of a compression spring.

Figure 8:
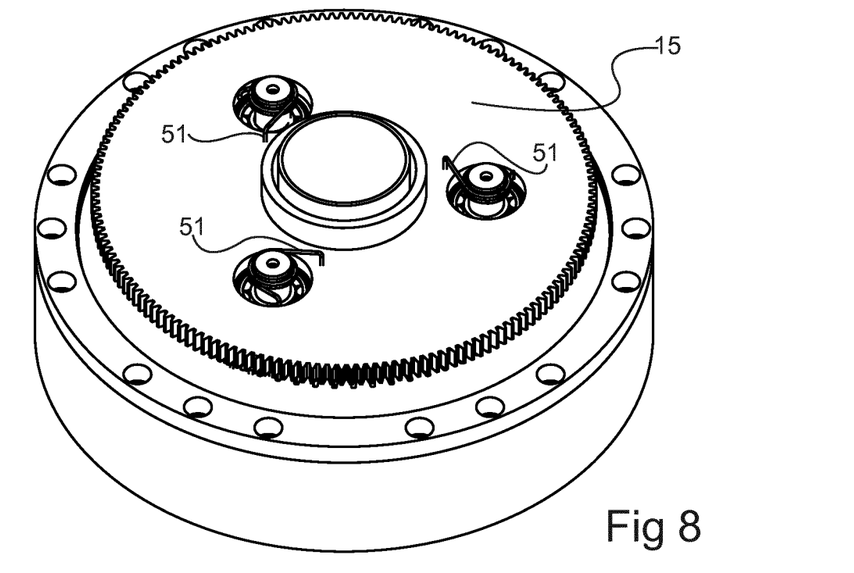

Yet another option for obtaining a pre-tensioning arrangement is shown in FIG. 8, where an individual spring 51, attached to the planet holder 15, is used for each planet connector.

The present disclosure is not limited by the illustrated embodiments, and may be varied and altered in different ways within the scope of the appended claims.

The invention claimed is:

1. An epicyclic gear train comprising a driving member, driving a plurality of planetary gears, each planetary gear being attached to a planetary holder and rotating around a planetary axis, and having at least one gear portion, meshing with at least one ring gear, one of the ring gear or the planetary holder thereby being made to rotate about a central axis of the epicyclic gear train, the other one of the ring gear or the planetary holder being fixed to a stationary part of the epicyclic gear train, wherein each planetary gear is attached to the planetary holder via at least one planetary connector which is rotatable around an axis which is offset from and parallel to the planetary axis, such that turning said at least one planetary connector alters the distance between the central axis and the planetary axis via an eccentric connection, wherein said at least one planetary connector is rotatingly pre-tensioned to apply a pressure on the planetary axis away from the central axis, and said at least one planetary connector being attached to the planetary holder by a bearing.

2. The epicyclic gear train according to claim 1, wherein the at least one planetary connector of each planetary gear is pre-tensioned.

3. The epicyclic gear train according to claim 2, wherein a central gear, which is co-axial with the central axis, is pre-tensioned by a spring, the central gear meshing with planetary control gears connected to the at least one planetary connector of each planetary gear.

4. The epicyclic gear train according to claim 1, wherein the at least one planetary connector of each planetary gear comprises a spring, individually pre-tensioning the planetary connector.

5. The epicyclic gear train according to claim 3, wherein the spring is a helical torsion spring.

6. The epicyclic gear train according to claim 3, wherein the spring is a blade spring or a coil spring.

7. The epicyclic gear train according to claim 1, wherein each planetary gear has first and second interconnected gear portions, the first gear portion meshing with a first ring gear, which is stationary, and the second gear portion meshing with a second ring gear which has a different number of teeth compared to the first ring gear and is thereby made to rotate about the central axis of the epicyclic gear train.

8. The epicyclic gear train according to claim 7, wherein at least one of the first and second gear portions and the first ring gear and the second ring gear with which the at least one of the first and second gear portions meshes is bevelled.

9. The epicyclic gear train according to claim 1, wherein the driving member drives the planetary gears by driving the planetary holder via a planetary holder gear, and an opening through a center portion of the epicyclic gear train is provided allowing passage of cables through a center of the epicyclic gear train.

10. The epicyclic gear train according to claim 1, wherein the bearing is a ball or roller bearing.

11. The epicyclic gear train according to claim 1, wherein the bearing is a plain bearing.

12. The epicyclic gear train according to claim 1, wherein the driving member is a driving pinion.

13. The epicyclic gear train according to claim 3, wherein each of the planetary control gears is connected to an end of a planetary shaft.

* * * * *